United States Patent [19]

Ticcioni et al.

[11] Patent Number: 5,060,167

[45] Date of Patent: Oct. 22, 1991

[54] ELECTRONIC PROGRAMMABLE WATER TREATMENT CONTROLLER

[75] Inventors: James E. Ticcioni, Mequon; Robert W. Colburn, Green Bay; Richard V. D. Baxter, Neenah, all of Wis.

[73] Assignee: Bruner Corporation, Milwaukee, Wis.

[21] Appl. No.: 371,546

[22] Filed: Jun. 26, 1989

[51] Int. Cl.$^5$ .............................................. G06F 15/46
[52] U.S. Cl. .................................. 364/509; 364/500; 364/132; 364/510
[58] Field of Search ............... 364/500, 141, 148, 509, 364/510, 132; 210/96.1, 141, 143

[56] References Cited

U.S. PATENT DOCUMENTS

| | | | |
|---|---|---|---|
| 3,815,747 | 6/1974 | Clack et al. | 210/140 |
| 3,960,721 | 6/1976 | Heskett | 210/190 |
| 4,239,621 | 12/1980 | Heskett | 210/687 |
| 4,298,468 | 11/1981 | Heskett | 210/136 |
| 4,421,652 | 12/1983 | Heskett | 210/687 |
| 4,536,845 | 8/1985 | DeVale et al. | 364/500 |
| 4,568,464 | 2/1986 | Blay et al. | 210/143 |
| 4,626,984 | 12/1986 | Unruh et al. | 364/132 |
| 4,648,043 | 3/1987 | O'Leary | 210/143 |
| 4,830,757 | 5/1989 | Lynch et al. | 364/500 |

Primary Examiner—Parshotam S. Lall
Assistant Examiner—Ellis B. Ramirez
Attorney, Agent, or Firm—Christie, Parker & Hale

[57] ABSTRACT

The Electronic Programmable Water Treatment Controller provides an integrated initiator and sequencer for controlling regeneration of water softening and filtering systems. The controller initiates the regeneration sequence or, in the alternative, an alarm based on a programmable prediction time total flow through the water treatment device or combinations of the foregoing. The sequence of regeneration is controlled in response to selected parameters programmable by the user for valve actuation and timing. Multiple water treatment systems may be controlled in alternating, parallel, or progressive control schemes through communication between controllers, attached to each system, which employ the present invention.

7 Claims, 7 Drawing Sheets

ELECTRONIC PROGRAMMABLE WATER TREATMENT CONTROLLER

BACKGROUND OF THE INVENTION

1. Field of the Invention

The present invention relates generally to controllers for water softening and filtering systems. In particular, the invention provides a controller for initiating an alarm or regeneration sequence based on a programmable prediction time, total flow through the water treatment device, or combinations thereof, and controlling the sequence of regeneration in response to selected parameters for valve actuation and timing. The invention further provides the capability for integrating multiple water treatment systems for alternating, parallel or progressive water flow through each of the respective systems.

2. Prior Art

Water treatment systems for softening or filtration of hard water typically require regeneration after the treatment of a quantity of water. Apparatus and methods for the softening of water for residential or commercial applications use are exemplified by U.S. Pat. Nos. 3,815,747; 3,960,721; 4,298,468; 4,239,621; and 4,421,652.

In typical water softening systems, hard mineral ions are removed from the water by passing the hard water through a cation exchange resin. These resins are typically in granular form and remove the hard mineral ions and replace them with other cations, typically sodium.

After treatment of a large enough volume of hard water, the resins become exhausted. The resin may be regenerated by passing a sodium chloride solution or brine through the resin. Steps to loosen the resin, typically known as back-washing, and rinsing of the brine from the resin are additional steps taken in the regeneration cycle. Multiple back-washing steps, rinsing steps, and flushing steps may be performed in an optimized cycle to regenerate the resin.

Control of a prior art regeneration system was typically accomplished first through the use of an initiator which monitored time or total flow of hard water through the system and generated a signal upon reaching a preset limit. The signal from the initiator was received by a sequencer which mechanically or electrically activated valving to accomplish the regeneration sequence. A lack of compatibility between initiators and sequencers produced by different manufacturers has often prevented consumers from optimizing regeneration of water softening systems to meet individual needs. Further, use of multiple water softening units in alternate configurations where one unit produces soft water while the other unit is in regeneration or on standby, parallel operation where multiple water treatment units are operated in parallel, but undergo regeneration at different times, or progressive operation where multiple water treatment units are available and placed on line only as demand requires and individually regenerating when off line, has not been possible due to lack of a controller capable of coordination of multiple systems.

SUMMARY OF THE INVENTION

The present invention overcomes the shortcomings in the prior art by integrating an initiator and sequencer in a single control unit. Further, the invention provides for communication between control units for coordinated operation of multiple water treatment systems. The invention provides a plurality of valve control signal outputs, one of which controls the service valve allowing treated water to be extracted from the system. A first status input receives a valve position signal which allows comparison of the actual condition of regeneration valving with the control outputs from the invention. Rate of flow for water from the water treatment system is received by the invention on a flow rate input for calculation of current and total flow through the water treatment system. An input means is provided for selection of the operational type of the invention, interrogation of the status or manual control of the operation of the water treatment system. In the present embodiment, the input means comprises a first plurality of switches for selection of the operational type and an input keypad for input of control parameters for the regeneration sequence as well as interrogation of the controller status, control parameters, and manual operation of the water treatment system regeneration. A memory is provided for storage of control parameters received from the input means. A display unit is employed for alpha numeric display of the status during normal operation, an alarm indication during abnormal operation, and display of mode programming step or regeneration step responsive to signals from the input means. An audible alarm, which may be selectably silenced, augments the display unit for notification of abnormal conditions.

A plurality of timing means programmable through the input means are connected to the valve control signal output means for activation thereof. An additional timing means programmable through the input means, and a means for calculating the total flow selectably initiate a regeneration cycle, thereby initiating the plurality of timers. Means for communication between two or more controllers, including means for recognizing a master/slave status allows simultaneous coordinated operation of two or more water treatment systems.

DETAILED DESCRIPTION OF THE INVENTION

Figure 1:
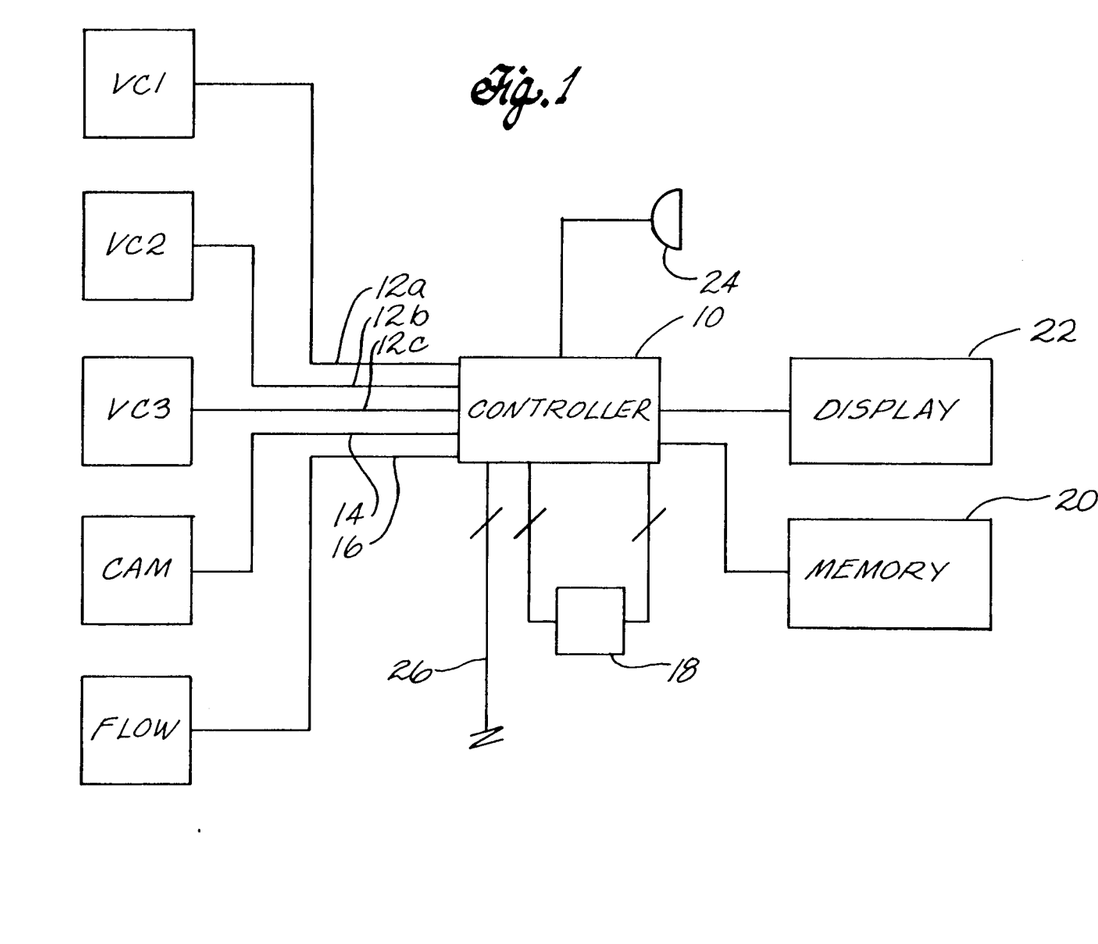
FIG. 1 is a general block diagram schematic representation of the invention.

The overall architecture of a present embodiment of the invention is shown in FIG. 1. The controller 10 has three control signal outputs 12a, 12b and 12c. The configuration shown in FIG. 1 connects each of the output signals to a valve controller labeled VC1, VC2 and VC3, respectively. Each of the outputs may provide a high or low (on or off) signal. Those skilled in the art will recognize that two of the output lines in combination may be used for operation of regeneration valve packages requiring multiple signal inputs such as that described in U.S. Pat. No. 3,797,523. For example, the first output could provide an enabling signal when high, with the second output providing a strobe when high to clock a multiple-position valve through various positions. As an alternative, the first and second outputs combined could provide a two-bit decodable signal corresponding to four positions in a multi-position valve controller.

In the embodiment shown, the third output signal is connected to valve controller VC3, which controls position of the service valve on the water treatment system. The service valve in the open position allows water flow from the treatment system for use while the service valve in the closed position precludes use of water from the treatment system. Typically, the service valve is closed during regeneration of the water treatment system to prevent the regeneration brine or water employed in backwash and flush of the system from being drawn into the user's water system. The service valve may also be closed when the treatment capability of the system has been exhausted to prevent drawing of untreated water into the user's system. In multiple-treatment system applications, the service valve will be closed when the particular treatment system controlled by the service valve is not on line or in a standby condition. A status input 14 on the controller receives a position signal from the service valve. Typically, the position signal is obtained through a micro-switch engaged by a cam mechanically connected to the valve. Connection of the cam switch to the status input allows comparison by the controller of the commanded service valve position, based on the actual position of the valve as indicated by the cam switch.

A flow rate input 16 to the controller is connected to a flowmeter in the present embodiment, as will be described in greater detail subsequently. The flowmeter may be one of three types: a hall effect flow transducer, a flow induced square wave generator, or a dry contact flow transducer. Calculation of total volume from the last regeneration and current flow rate is accomplished by the controller.

An input means 18 allows the user to select, set and monitor the various functions of the invention. In the present embodiment, the controller is configured for six regeneration schemes for individual water treatment systems or multiple systems operating alternately or in parallel.

Figure 2:
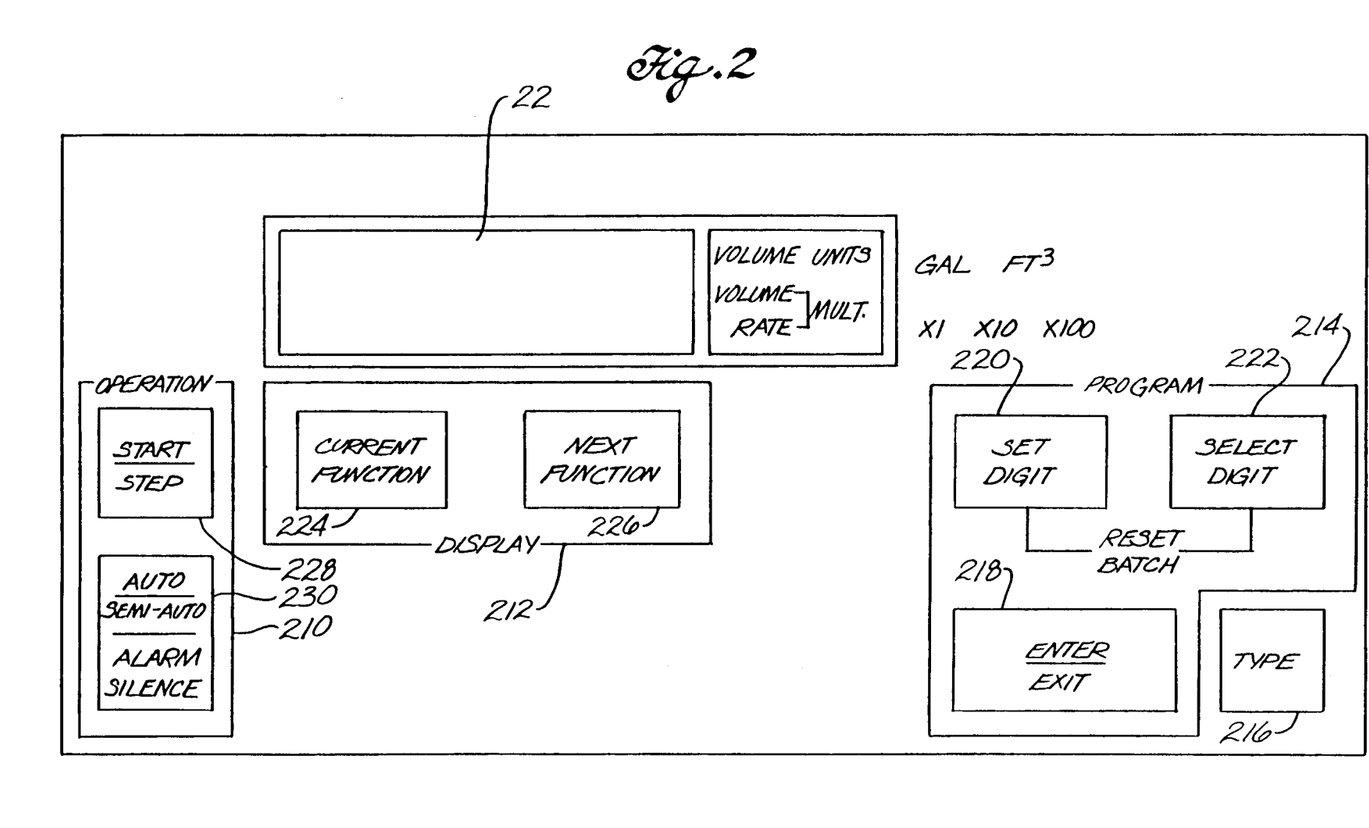
FIG. 2 is a pictorial representation of the front panel of the invention.

As shown in FIG. 2, a portion of the input means comprises an input keypad having keys grouped by function into an operation group 210, a display group 212, a program group 214, and a type key 216. The operation of these key groups will be described in greater detail subsequently. A second portion of the input means comprises a set of DIP switches 310 which, through adjustment by the user, determine the program type and configuration of the control unit. Switches 310a, 310b and 310c provide a three-bit code designating the program type. Switch 310d allows selection of electrical frequency for 60 Hz or 50 Hz operation. Switch E, when closed, selects a time-compression factor of one second equal one minute. Switches 310f, 310g, and 310h provide a three-bit configuration definition. For example, a single water treatment system application would be indicated by switches F, G and H in the open or off position. Switch H, in the closed or on position, designates a multiple water treatment system operation, with switch F designating an alternating or parallel configuration. Switch G selects master slave status for each of the controllers in the multiple system application. A memory 20 is connected to the controller to provide storage for user selected parameters input from the key pad. Those skilled in the art will recognize that program keystrokes with additional memory storage locations may be used to replace the DIP switches for keyed in configuration and timing parameter selections. The DIP switches of the present configuration avoid reprogramming of those parameters after a power loss if memory loss is not avoided by power failure prevention techniques to be described subsequently.

A display 22 provides readout, in an alphanumeric format, of various information regarding status of the controller. During the input of various control parameters, the display provides prompts for the necessary input followed by display of the parameter in the default condition or as input from the key pad. In the RUN mode, the display provides a readout of the volume remaining for water which may be treated before exhaustion of the system alternating with a current flow rate of the treated stream. If an abnormal condition, as will be described subsequently, is present, the display will show an alarm condition. During regeneration of the water treatment system, the display indicates the particular cycle of regeneration presently active and time remaining in that cycle.

An audible alarm 24 is connected to the controller for activation in conjunction with an alarm condition on the display. The audible alarm is selectably operable immediately upon determination of an alarm condition or after a user selected time delay. In the alternative, the alarm may be silenced.

A multiline communications means 26 is provided for connection of multiple controllers in applications requiring multiple water treatment systems. Communications between the controllers allows coordinated operation of the water treatment systems to avoid interfering regeneration sequences which would deprive the user of treated water.

Figure 3:
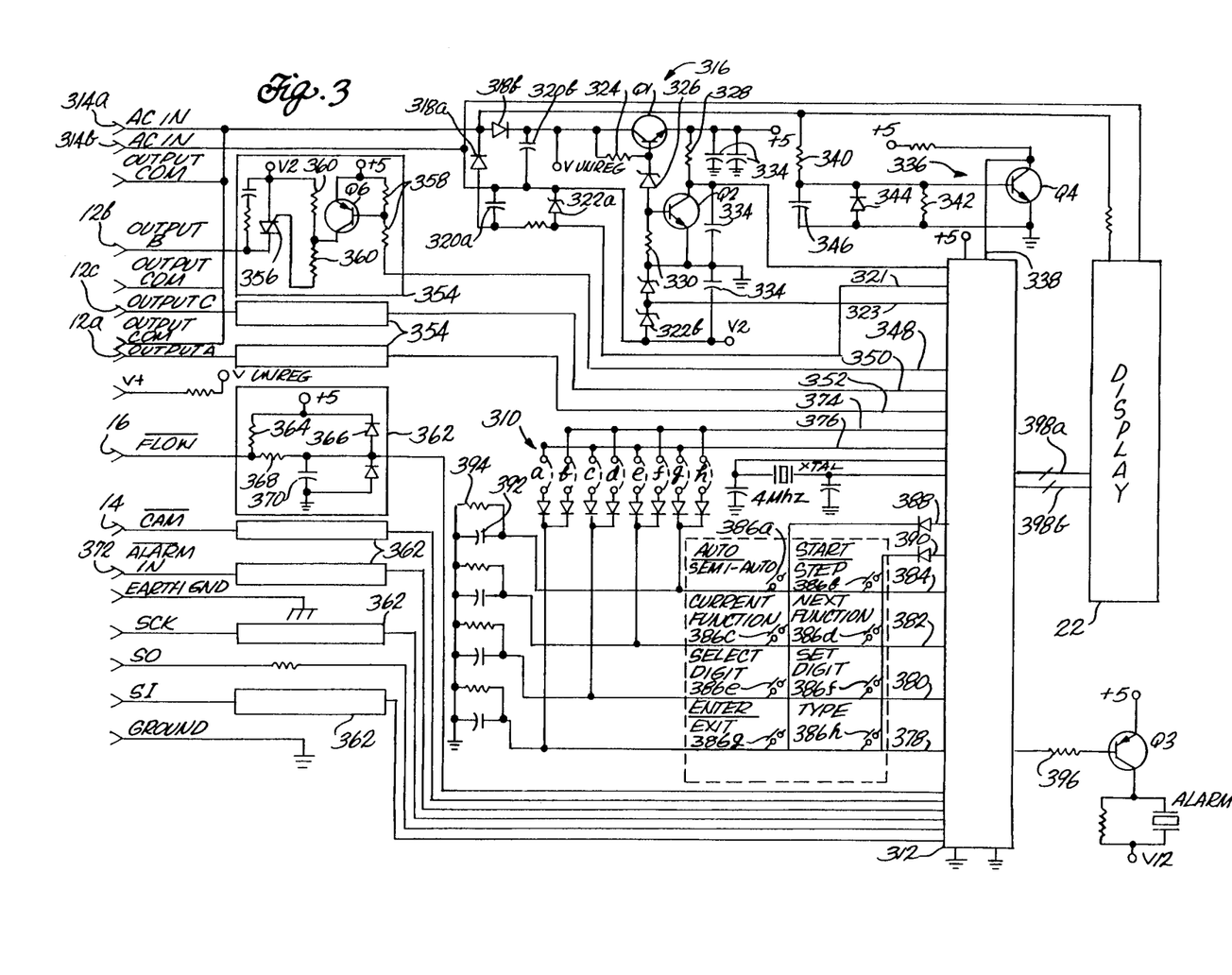
FIG. 3 is an electrical schematic of a first embodiment of the invention.

Details of the structure of the present embodiment are shown in FIG. 3. The primary element of the controller is a microprocessor 312. AC power is provided to the controller on inputs 314a and b. In the present embodiment 24 volt AC power provided by a transformer (not shown) from standard line AC received at the AC inputs is provided to a power supply circuit 316 for conversion regulated 24-volt pick off V2, a +5-volt pick off, and an unregulated pick off VUNREG. Rectification is accomplished by diodes 318a and 318b in combination with capacitors 320a and 320b. A first regulated voltage is provided to the microprocessor on input 321 regulated by ZENER diode 322a. A second regulated voltage provided to the microprocessor on input 323 is regulated by ZENER diode 322b. Transistor Q1 biased by resistor 324 steps down the voltage to +5 for the five-volt pick off. Transistor Q2 in conjunction with ZENER diode 326 and resistors 328 and 330 provide fine regulation of the +5-volt supply. A reset input 332 presets the microprocessor on a power up condition. Capacitors 334 are employed to reduce ripple. Those skilled in the art will recognize alternative power supply configurations for use in the present invention.

A master clock circuit 336 provides a real time clock input 338 for the microprocessor. A five-volt peak clock pulse is provided through transistor Q4 in response to the alternating current frequency of the AC input power. As previously described, designation of 50 Hertz power or 60 Hertz power by selection of DIP switch 310e allows the microprocessor to properly interpret the clock input for real time calculation. Biasing of transistor Q4 is accomplished through resistors 340 and 342 with half-wave rectification through diode 344 in conjunction with capacitor 346.

Valve control outputs are provided by the microprocessor on lines 348, 350 and 352. Output buffers 354 convert the output signal of the microprocessor to a 24-volt signal off pick off V2 for operation of the valve controllers. Each of the output buffers employs a switching transistor Q6 to provide gating of a triac 356 to provide power to the output. Resistors 358 provide proper biasing of the switching transistor while resistors 360 provide biasing of the triac.

Inputs to the microprocessor are received through input buffers 362. Each buffer provides a pull up for the microprocessor input to +5 through resistor 364 and diode 366. An RC filter comprising resistor 368 and capacitor 370 filter the input signal. Input signals to the controller are asserted by drawing down the respective input line as designated by signals FLOW BAR and CAM BAR for the flow input and valve position input respectively. In the embodiment shown, an additional input 372 is provided as a supplementary system status signal. As an example, an external alarm designating a condition such as low brine level in the water treatment system represented by ALARM BAR IN for evaluation by the microprocessor in overall system control.

In the present embodiment both the DIP switch portion and keyboard portion of the input means employ a matrix decoding scheme from four strap outputs from the microprocessor to four return inputs to the microprocessor. The eight DIP switches alternatively connect strap outputs 374 and 376 to return inputs 378, 380, 382 and 384. Polling of circuit connection by the microprocessor decodes the DIP switch positions for the respective functions previously described. The individual keys on the keyboard 386a through 386h releasably connect strap outputs 388 and 390 to the four return inputs. The signals resulting from keystrokes are maintained by capacitors 392 for a read cycle time on returns and are bled to ground through resistors 394.

As shown in FIG. 2 the key pad is arranged to group keys with similar functions. The program key group includes an enter/exit key 218 which toggles the controller between the two operating modes RUN or PROGRAM. In the PROGRAM mode a prompt is momentarily visible on the display followed by a numeric display with at least one digit flashing or a flashing word display. The flashing word or digit is altered using the set digit key 220. Selection of the next digit for alteration is accomplished by depressing the select digit key 222. If the prompt was not seen, the current function key 224 may be depressed to momentarily recall the prompt to the display. Selection of the next programming step is accomplished by depressing the next function 226 which then causes a momentary display of the prompt for the next programming step followed by the flashing word or numerical value with flashing digits.

With the controller in the RUN mode, depressing the START/STEP key 228 will initiate a regeneration sequence. Steps in the regeneration sequence to be described in greater detail subsequently may be terminated prior to programmed completion by depressing the START/STEP key. The START/STEP key must remain depressed for three seconds to initiate or step through the regeneration sequence. The second key in the operation group is the AUTO/SEMI-AUTO and ALARM SILENCE key 230. Depressing this key for three seconds toggles the controller between AUTOMATIC mode in which the controller initiates and accomplishes regeneration automatically, or SEMI-AUTOMATIC mode in which the controller calculates all functions of RUN sequence but generates an alarm condition notifying the operator of the requirement for regeneration as opposed to automatically initiating regeneration. The regeneration sequence is then accomplished manually by depressing the START/STEP key. Key 230 also allows silencing of the audible alarm when activated by momentarily depressing the key. The extended depression time required in the operation group keys avoids inadvertent initiation of a regeneration sequence or toggling of the controller into the SEMI-AUTOMATIC mode.

Continuing the description of details in the embodiment shown in FIG. 3, the communications means between controllers comprises a four-wire serial interface having a ground connection, a buffered serial clock SCK, a serial output SO, and a buffered serial input SI. Those skilled in the art will recognize that communications may be accomplished using other standard techniques such as RS485.

In an alarm condition as will be described subsequently, the microprocessor provides an output through resistor 396 to bias transistor Q3 to activate an alarm horn, 397. As previously described, the microprocessor may be programmed to inhibit activation of the alarm.

In the present embodiment of the invention the alphanumeric display 22 is an 8 segment vacuum fluorescent display providing 8 digits with alpha and numeric capability. The microprocessor communicates with the display through a plurality of control lines 398a for digit selection and a second plurality of control lines 398b for segment activation. Alternative display techniques may be employed.

The microprocessor in the preferred embodiment provides a plurality of timers keyed to the master clock for cycle timing during the regeneration sequence. Six timers are employed to provide three alternating cycle times for output A and output B respectively. One or more additional initiation timers are employed in several capacities to initiate the regeneration sequence. Selection of the regeneration sequence may be based on a specific timed cycle such as a specific time in each selected period (24 hours to 99 days), a specific time on a specific day in each weekly period and so on, depending on size and flow rate in the water treatment system being controlled.

As previously described, the microprocessor receives flow rate information for calculation of current flow rate and total flow. A preset total flow value may be employed to initiate the regeneration sequence and the initiation timer may be employed to delay initiation of regeneration for a predetermined period of time after reaching the preset total flow condition.

Figure 4A:
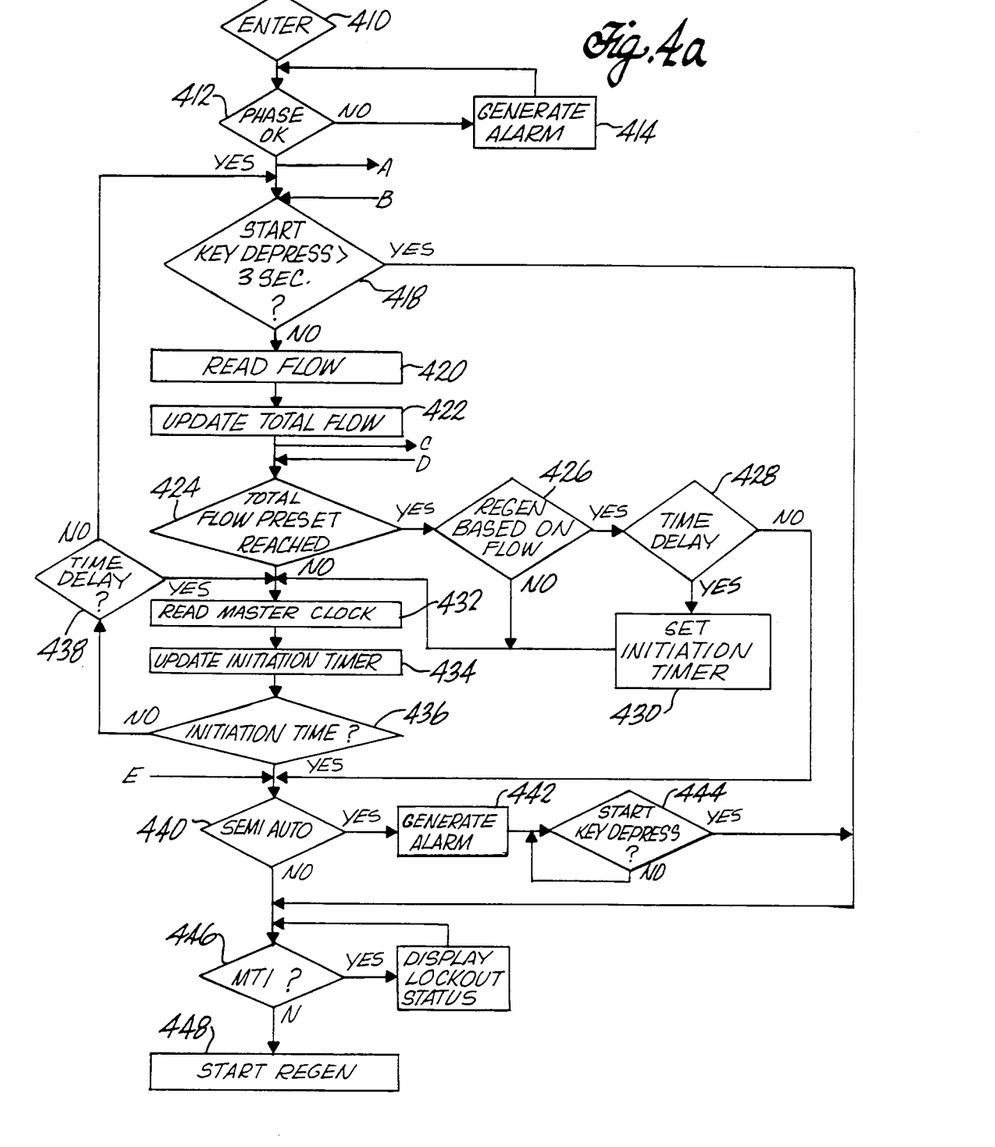
FIG. 4a is a flow diagram of the operation of the invention.

In the present embodiment, implementation of the timers and flow calculation is accomplished through software control of registers in the microprocessor or equivalent virtual registers in the memory. Operation of the microprocessor in controlling the various functions previously described is best understood with reference to FIG. 4. Programming of the individual attributes in the operation of the system will be described subsequently.

Upon power up the controller is reset as previously described and enters the run mode at box 410. The microprocessor compares the CAM$_c$ input with the commanded service valve position on output C. This is designated a phased comparison as shown in box 412. If the CAM signal indicates the service valve is closed while output C is not energized, thus commanding the service valve open, an alarm will be generated as shown in box 414. The microprocessor polls the input means, specifically DIP switches 310$f$, $g$ and $h$, to determine if a multiple water treatment system is present as shown in box 416. Multiple system operation will be discussed subsequently. If the switch status indicates a single treatment system, the microprocessor next polls the input means for depression of the START key as shown in box 418. As previously described, depression of the START key initiates a regeneration sequence. If the START key has not been depressed, the microprocessor reads the flow rate on input 16 as shown in box 420. The microprocessor updates the total flow since reset as shown in box 422 in the present embodiment the microprocessor outputs to the display the flow rate at 10 second intervals, alternating with the treatable water volume remaining based on a preset capacity of the treatment system less the total flow. The microprocessor then determines if the preset total flow indicating exhaustion of the treatment system has been reached as shown in box 424. If total flow has been reached, the microprocessor determines if regeneration is to be commanded based on total flow or a preset time as shown in box 426. If regeneration is based on total flow, the microprocessor then determines if a time delay after reaching total flow has been imposed as shown in box 428. If a time delay has been specified by the user, the microprocessor then sets the delay value in the initiation timer as shown in box 430. The microprocessor then reads the master clock as shown in box 432 and updates (decrements) the initiation timer as shown in box 434.

If regeneration is to be initiated on a timed basis as opposed to total flow, the microprocessor would pass directly from block 424 to block 432 and a preset value would exist in the initiation timer which would be decremented on the master clock cycle by the microprocessor. Based on the initiation timer as shown in block 436, the microprocessor will continue flow monitoring and time update or begin the regeneration sequence. If timing is in process on a time delay as shown in block 438, the microprocessor will cycle the clock until time out.

After the microprocessor determines that regeneration is required by total flow with or without time delay or timed initiation, the microprocessor will determine if the SEMIAUTO switch has been depressed as shown in block 440. If the switch has been depressed placing the system in semiauto mode, the microprocessor will generate an alarm as shown in block 442. The microprocessor will then monitor for depression of the START key as shown in block 444. If the system is not in the semiautomatic mode, the microprocessor will poll the communications means to determine if the multiple tank interlock (MTI) is set as shown in block 446 which will be described in greater detail subsequently. If the MTI is not set, a regeneration will be initiated as shown in block 448.

Figure 5:
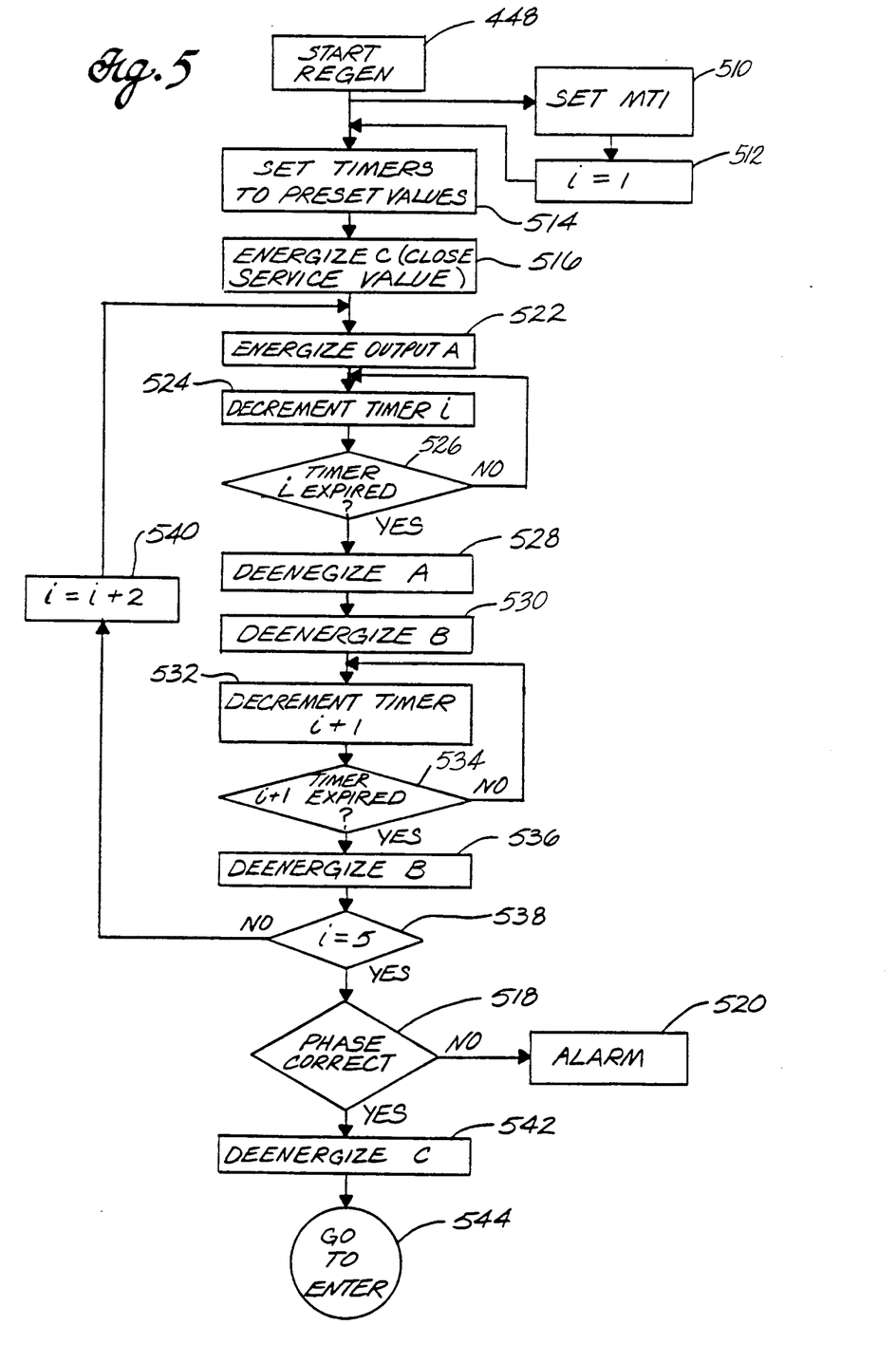
FIG. 5 is a flow diagram of the regeneration control sequence of the invention.

The regeneration sequence is shown in FIG. 5. Once a regeneration has been initiated, the microprocessor will set the MTI as shown in block 510. In the embodiment shown in FIG. 5, a counter, i, is set to one as shown in block 512. The microprocessor then sets the six timers of the present embodiment to the preset values selected by the user as shown in block 514. The service valve is then closed by energizing output C as shown in block 516. Output A is then energized as shown in block 522. The first timer is decremented by the microprocessor as shown in block 524. The microprocessor continues to decrement the first timer in response to the master clock as indicated by block 526 until the timer has expired. Output A is then deenergized as shown in block 528 and output B is energized as shown in block 530. The second timer is then decremented and monitored as shown in blocks 532 and 534 until the second timer has expired at which time output B is deenergized as shown in block 536. If counter i does not equal 5, as shown in block 538, the counter is incremented by 2 as shown in block 540, and blocks 522 through 536 are repeated for timers 3 and 4 and again for timers 5 and 6.

Those skilled in the art will recognize that the quantity of timers and valve control outputs may be modified to accommodate any desired configuration.

Upon completion of the regeneration cycle as determined by the six timers, the microprocessor verifies via the CAM input that the valve control has returned to "home" position thus assuring the electromechanical and electronic element are in phase as shown in block 518. If the valve control fails to "home", an alarm condition is given as shown in block 520. The microprocessor then deenergizes output C as shown in block 542, reopening the service valve to reenter service as shown in block 544. Those skilled in the art will recognize that additional logic may be required prior to deenergizing output C in block 542 if a multiple system, as will be described subsequently, is present.

Figure 4B:
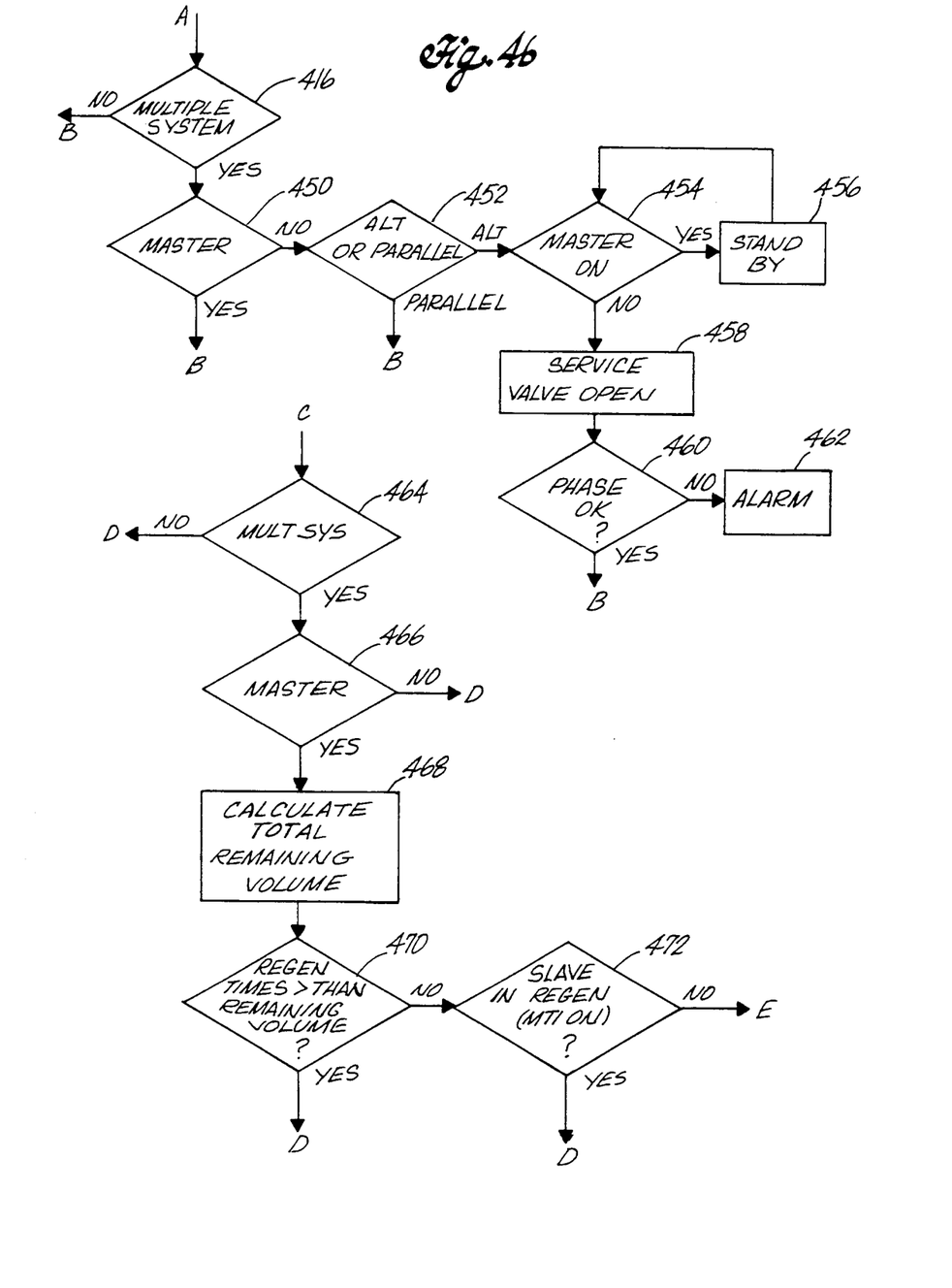
FIG. 4b is a supplemental flow diagram for operation of the invention in multiple water treatment system applications.

When employed in a multiple treatment system configuration, operation of the microprocessor is shown in FIG. 4$b$. If polling of the input means in block 416 indicates a multiple treatment system, the microprocessor polls the input means, DIP switch 310$g$ in the embodiment shown in the drawings, to determine a status as master or slave as shown in block 450. If the controller is in a master configuration, the microprocessor continues at entry point B in FIG. 4$a$. If the status of the controller is that of a slave, the microprocessor determines the program type as alternate or parallel operation as shown in block 452. If the water treatment systems are operating in parallel, the microprocessor continues operation at entry point B in FIG. 4$a$. If the systems are operating in an alternate configuration, the microprocessor on the slave device polls the communication means to determine if the master controller is in the flow mode as shown in block 454. If the master is flowing, the slave controller remains in the standby condition as shown in block 456. If the master is not flowing, the microprocessor on the slave will open the service valve as shown in block 458, verify phase of the valve as shown in block 460 issuing an alarm if phase is improper as shown in block 462, and enter operation at entry point B of FIG. 4$a$.

Those skilled in the art will recognize that position of the service valve by the controllers of a multiple water treatment system configuration will be determined by the master/slave status at the entry point in block 410 of FIG. 4a. Similarly, a slave controller operating in the standby mode of block 456 will continue monitoring for START key depression for manual regeneration initiation.

In a multiple treatment system configuration, after updating total flow as shown in block 422, the microprocessor will poll for multiple system configuration as shown in block 464 at exit point C of FIG. 4a. If a multiple system is not present, the microprocessor continues operation at entry point D in FIG. 4a. If a multiple system is present, the microprocessor again determines master or slave status as shown in block 466 and if not a master reenters at point D of FIG. 4a. If the micro controller is a master, total remaining volume is calculated as shown in block 468 and a determination of time remaining to regeneration at the present flow rate compared to a regeneration time is made as shown in block 470. This determination avoids depletion of several systems simultaneously thereby staggering regeneration and avoiding the requirement for simultaneous regeneration. If sufficient flow volume remains to continue operation, the microprocessor reenters at entry point D in FIG. 4a. If insufficient time remains, the master microprocessor will poll the communication means to determine if the slave microprocessor is currently undergoing regeneration. If regeneration of the slave is in process, the slave will return on line prior to exhaustion of the master and the master microprocessor reenters at entry point D of FIG. 4a. If the slave is not undergoing regeneration, the master will initiate a regeneration sequence in the controller with the least available "on line" time remaining at entry point E of FIG. 4a.

Figure 4C:
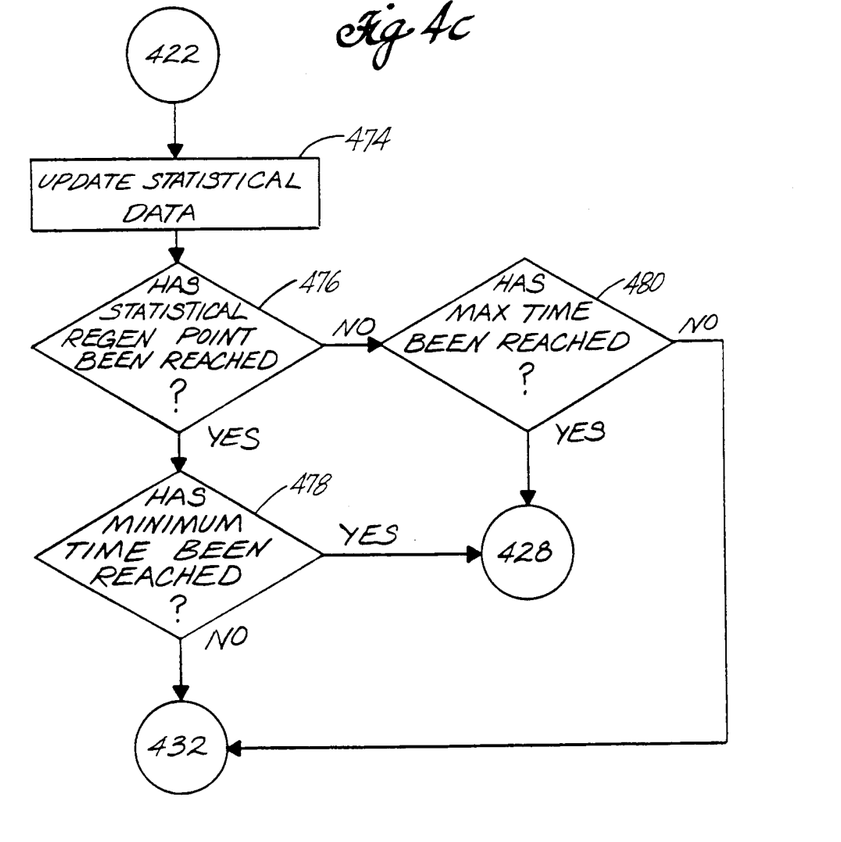
FIG. 4c is a supplemental flow diagram for operation of the invention with a statistical prediction technique.

As an alternative to user present volumes or times for regeneration initiation, the microprocessor may operate as shown in FIG. 4c. Flow data obtained in block 422 may be employed to update a statistical data base as shown in block 474 for monitoring of water usage on a volume and time basis. Regeneration may then be based on a mathematically calcuated prediction factor for exhaustion of the system as demonstrated in block 476. A volume initiation override timer is employed supplementally to start a regeneration even if the preset volume has not been reached as shown in block 478. Such a minimum time period may be established, for example, as a 24 hour block. In the alternative or in addition, a maximum time between regenerations may be established and regeneration initiated based on that maximum time as shown in block 480. Continued monitoring of the initiation timer or initiation of the regeneration sequence is then accomplished by transitioning to blocks 428 or 432, respectively.

As previously described, a memory is associated with the microprocessor for storage of the control parameters and interim calculations within the microprocessor for the various control functions. A present embodiment of the invention employs volatile memory and provides two power failure memory retention means. A first capacitive means retains sufficient voltage for memory integrity for short periods of power failure. A battery backup system may be employed to further extend memory integrity beyond the decay time of the capacitive protection means. In the present embodiment, failure of the 24 volt AC power input inhibits the output control means for the regeneration sequence valves and service valves. While this feature conserves power to allow maximum memory retention and microprocessor function, initiation of a regeneration sequence is not possible. Consequently, upon power failure, an alarm condition is generated by the microprocessor notifying the user that regeneration was not possible if the initiation sequence has been reached during a power failure.

Those skilled in the art will recognize alternate power failure protection means and the potential for replacement of the memory with a non-volatile data storage system for power failure protection.

In addition to the alarm indications for power failure, phase inconsistency and inhibited regeneration START based on placement of the controller in the SEMIAUTO mode, an alarm condition is asserted by the microprocessor in response to the communication means if improper connection of the communication means between controllers is present. In the embodiment shown in the drawings, if DIP switch 310h is on, indicating a multiple tank application, the microprocessor polls the communication means including the serial output and serial input, for communication with the other controllers. If no communication signals are present, the alarm is asserted.

In the present embodiment as described above, the invention executes 12 program types. The first program type, designated type 00, a single water treatment system is regenerated a maximum of once per 24 hour period based on treated water used. The regeneration schedule is determined automatically by the controller through the use of a mathematical formula which calculates a prediction factor as previously described with respect to FIG. 4c. The factor is affected by water usage patterns of both a daily and weekly nature. Also included is a calendar override feature which allows the user to force regenerations to occur on a fixed time interval basis should an extended length of time occur between water usage periods. This prevents organic contamination buildup in the media of the treatment device. The fixed calendar override interval is programmable from one to 99 days. The regeneration sequence may be delayed to a user set time. The unit returns to service immediately following regeneration. This program type is selected by placing DIP switches 310a, b and c in the off position and DIP switches F, G and H in the off position.

Program types 0D and 09 are the same as type 00 except that the system will operate with two water treatment systems, one of which will be on line while the other is regenerated and standing by. Only one system will regenerate each 24 hour period as determined by the controller. The pair will alternate as each is calculated to be exhausted. Simultaneous regeneration is prevented by the multiple tank interlock as previously described. DIP switches 310a, b and c are in the off position while DIP switch H is in the on position in both controllers with DIP switch G on for the master controller and off for the slave controller as previously described. DIP switch F will be in the off position designating an alternate configuration as opposed to a parallel configuration.

Program type 20 is employed for a single water treatment system regenerating based on a user set volume or total flow. The only limiting factor on the number of regenerations is the speed at which the brine system of the water treatment system can produce brine. In most cases the treatment system should be sized to allow brine makeup. Regeneration will be initiated immediately upon reaching the user set volume. The system returns to service immediately upon regeneration. DIP switches for this selection are 310a-OFF, 310b-ON, 310c-OFF. Program types 2D and 29 are the same as type 20 except the system operates with two water treatment systems, one of which is on line while the other is regenerated and standing by. Each tank may regenerate independently as the user set volume of each tank is reached. Simultaneous regeneration is not possible based on setting of the MTI as previously described. Selector switches 310a-OFF, 310b-ON, 310c-OFF, 310f-OFF, 310h-ON, and 310g-ON for the master controller and off for the slave controller engage these program types.

Program type 2E and 2A and the same as type 20 except the system will operate two water treatment systems, both of which are on line simultaneously (parallel). As each tank's user set volume is treated, it will be taken off line immediately, regenerated and placed back on line immediately. However, to preclude the possibility of one system reaching exhaustion during the regeneration of the second system, premature regeneration of the tank having the least volume remaining will occur if the tank having greater volume remaining is not capable of providing treated water for the duration of a regeneration as previously described with respect to FIG. 4b, blocks 470 and 472. Selector switch settings are identical to program type 2D and 29 with the exception of DIP switch 310f which is placed in the on position.

Program type 30 employs a single water treatment system regenerating a maximum of once per 24 hour period based on a user set volume of treated water with the regeneration sequence delayed to a user set time. The unit returns to service immediately following regeneration. Selector switches are set with DIP switch 310a and b ON, 310c OFF.

Program type 3D and 39 operate similarly to type 30 except the system will operate with two water treatment systems, one of which is on line while the other is regenerated and standing by. Only one tank will regenerate in each 24 hour period as needed. Selector switch settings are DIP switch 310a-ON, 310b-ON, 310c-OFF, 310f-OFF, 310g-OFF or ON designating the slave and master systems respectively, and 310h-ON.

Program type 40 employs a single water treatment system regenerating on the basis of equal time intervals set by the user. Regeneration is initiated at the user set time with the unit returning to service immediately following regeneration. This program type is selected with DIP switches 310a and b-OFF and 310c-ON.

Program type 4D and 49 are identical to type 40 except that two water treatment systems are employed, one of which is on line while the other is regenerated and standing by. Only one system regenerates in each user set interval. The pair alternates as each interval begins and simultaneous regeneration is not possible. Selector switch settings for this program type are DIP switch 310a and b-OFF, 310c-ON, 310f-OFF, 310g-ON or OFF for master or slave respectively, and 310h-ON.

Program type 50 employs a single water treatment system regenerating on a day of the week schedule set by the user. The regeneration sequence initiates at the user set time. The unit returns to service immediately following regeneration. Selection of program type 50 is accomplished with DIP switches 310a-ON, 310b-OFF, 310c-ON.

Program types 5D and 59 are identical to type 50 with two water treatment systems operating on an alternate basis. Only one of the two media tanks will regenerate on the user selected day and the pair will alternate as each regeneration occurs. Simultaneous regeneration is not possible. Switch settings to obtain type 5D and 59 are DIP 310a-ON, 310b-OFF, 310c-ON, 310f-OFF, 310g-ON or OFF for master and slave respectively, 310h-ON.

Program type 10 is employed for a water treatment system for which regeneration is not possible such as a filtration system requiring replacement of the filters. The user selected volume or time programmed into the unit results in assertion of an alarm condition notifying the user of the requirement for filter replacement. Selection of this program type is accomplished with DIP switch 310a-ON and 310b and c-OFF.

Those skilled in the art will recognize that the program types defined are examples typical of regeneration control sequences which may be achieved using the present invention.

Programming of user selected times and volumes as well as regeneration cycle times and sequence are similar for all program types. "Programming required-type 30". If the numerical value is present on the display, the unit is in the run mode. Transition to the program mode is accomplished by depressing the ENTER/EXIT key. Depressing the TYPE key results in a display of the controller type designated by position of the DIP switches. Type 30 should appear. The display should show one of the following "phase", a numeric value, or "enter time" followed by a flashing display segment. "Phase" is an alarm condition indicating the valve operator on the service valve is not properly synchronized as previously described. Operator action to correct the unsynchronized condition is required. If the numeric value appears as previously described, the controller is in the run mode and the ENTER/EXIT key must be depressed. If the "enter time" display is present, the controller is in the program mode and programming may begin. If the controller previously was displaying the "phase" alarm condition after correction of the condition, the CURRENT FUNCTION key may be depressed to obtain the "enter time" prompt. Upon obtaining the flashing display segment presentation, the SELECT DIGIT key is depressed to alter the selected (flashing) segment while the SET DIGIT key is employed to alter the value. For example, in the enter time display a day, hour, minute and am/pm segments will appear on the display with one flashing. The SET DIGIT key is employed to alter the flashing segment while the SELECT DIGIT key alters the flashing segment between the day, hour, minute and am/pm designation. Upon completion of the time entry, the NEXT FUNCTION key is depressed and the display will prompt "enter START time". The display will then show digits denoting the hour of day, minute of hour, and am or pm. The SET DIGIT and SELECT DIGIT keys are employed as previously described to enter the desired START time for the regeneration sequence.

The user then depresses the NEXT FUNCTION key, resulting in a prompt "enter alarm time". The set digit and select digit keys are employed to enter a desired alarm time. The next function key is again depressed resulting in a prompt "enter alarm mode" followed by a flashing word "silent". The SET DIGIT key may be then used to select one of three options, silent, instant, or delayed. The NEXT FUNCTION key is again depressed resulting in a prompt "enter desired volume". The SELECT DIGIT and SET DIGIT keys are employed to enter the desired volume. The NEXT FUNCTION key is again depressed resulting in a prompt "enter cycle time". The display indicates "CYCl" with two digits flashing. The SET DIGIT key is employed to set the number of minutes desired in the cycle 1 timer. Each of the six cycle timers is then set employing the NEXT FUNCTION key as described. Cycle timers which are not employed in the desired regeneration sequence have a zero time entered.

Upon completion of entry of the cycle times, the NEXT FUNCTION key is again depressed, resulting in a prompt "enter meter factor". The SET DIGIT and SELECT DIGIT keys are employed to enter a meter factor to properly calibrate the flow meter input at FLOW for the volume per count. As previously described, a Hall effect, flow induced square wave generator, or dry contact flow meter may be employed. Upon depressing the next function key, a prompt "DONE" will appear. The system will automatically leave the PROGRAM mode and begin the RUN mode.

The invention as previously described may be employed to control various water treatment systems with different regeneration requirements.

After programming of the system for the desired program type, the microprocessor monitors flow and time as previously described. The user may initiate a regeneration sequence at any time by depressing the START/STEP key as previously described. In addition, the volume and initiation timer may be reset to the initial programmed values by simultaneously depressing the SET DIGIT and SELECT DIGIT keys. Testing operation of the device in the automatic mode may be accomplished by setting DIP switch 310e to the ON position, thereby compressing time by a factor of one second equal one minute as previously described. Alternatively, regeneration sequence operation may be verified by stepping through a regeneration sequence manually depressing the START/STEP key to initiate each step.

The present invention provides a highly flexible water treatment system controller for single or multiple water treatment systems. The invention combines the initiator and sequencer functions of the prior art employing sophisticated calculation means for sequence initiation based on user programmable input or statistically derived mathematical prediction. Sequence control is achieved with multiple cycle timers activating a plurality of valve control outputs.

Having now described the invention in detail as required by the patent statutes, those skilled in the art will recognize modifications to the embodiments disclosed, both as previously suggested and as otherwise required for specific implementations. Such modifications fall within the scope and intent of the invention as defined in the following claims.

What is claimed is:

1. A controller for water treatment systems having regeneration sequence valves and a service valve comprising:
    a plurality of valve control signal output means connected to the regeneration sequence valves and service valve;
    a first status input receiving a valve position signal from the service valve;
    a flow rate input receiving signals from a flow meter;
    means for calculating volume flow responsive to the flow rate input, said calculating means providing current flow rate and total flow volume;
    an input means for definition of regeneration parameters by a user;
    a memory connected to the input means to receive and store the regeneration parameters;
    a plurality of timing means programmable through the input means and connected to the valve control signal output means for activating thereof;
    an additional timing means programmable through the input means;
    control means for initiating the plurality of timing means to begin a regeneration cycle responsive to the programmed parameters, the total flow volume provided by the volume flow calculation means and the additional timing means;
    a display unit responsive to the volume flow calculation means, the input means, and the control means for communication to the user; and
    means for communication between multiple controllers includinq means for recognizing a master/slave status and means for recognizing a regeneration sequence in process in another controller to inhibit initiation of a regeneration by the controller.

2. An apparatus as defined in claim 1 further comprising means for generating an alarm coincident to initiation of the regeneration sequence.

3. An apparatus as defined in claim 1 further comprising means for generating an alarm responsive to inconsistency in the valve position signal and one of the valve control signal outputs.

4. An apparatus as defined in claim 3 further comprising means for generating an alarm condition for failure to communicate between controllers.

5. A controller for initiating and sequencing the regeneration of a water treatment system having regeneration sequence valves and a service valve, the controller comprising:
    a first plurality of means for providing valve control signal outputs said means connected to the regeneration sequence valves and service valve;
    means for calculating total flow volume responsive to a flow meter;
    a second plurality of timing means for activating the valve control signal output means and connected thereto;
    an additional timing means for timing of initiating a regeneration;
    means for programming the second plurality of timing means, and the additional timing means;
    control means for initiating a regeneration cycle responsive to the means for calculating total flow volume and the additional timing means, the control means initiating the second plurality of timing means; and
    wherein said response of the control means to the total flow volume calculation means and the additional timing means is preprogrammed.

6. A controller for initiating and sequencing water treatment systems having regeneration sequence values and a service valve as defined in claim 5 further comprising:
    means for communication between the controller and multiple identical controllers including means for recognizing a master/slave status; and
    means for recognizing a regeneration sequence in process in another controller to inhibit initiation of a regeneration by the controller.

7. A controller for initiating and sequencing water treatment systems having regeneration sequence valves and a service valve as defined in claim 6 further comprising:

means for calculating the current flow rate responsive to the flow meter and wherein the means for communication between multiple controller includes:

means for transmitting and receiving current flow rate and total flow volume; and wherein the control means is responsive to the current flow rate and total flow volume received from the other controllers.

* * * * *

UNITED STATES PATENT AND TRADEMARK OFFICE
CERTIFICATE OF CORRECTION

PATENT NO. : 5,060,167
DATED : October 22, 1991
INVENTOR(S) : J.E. Ticcioni; R.W. Colburn; R.V.D. Baxter It is certified that error appears in the above-identified patent and that said Letters Patent is hereby corrected as shown below:

Column 9, line 34, change "present" to -- preset --.

Signed and Sealed this

Twentieth Day of April, 1993

*Attest:*

MICHAEL K. KIRK

*Attesting Officer*    *Acting Commissioner of Patents and Trademarks*